United States Patent [19]

Brockmüller et al.

[11] Patent Number: 5,058,262
[45] Date of Patent: Oct. 22, 1991

[54] ATTACHMENT OF A HARD BEARING RING TO THE BORE SURFACE OF A HOUSING OR TO THE LATERAL SURFACE OF A JOURNAL

[75] Inventors: Uwe Brockmüller, Oberwerrn; Hans Freund, Schwebheim, both of Fed. Rep. of Germany

[73] Assignee: SKF GmbH, Schweinfurt, Fed. Rep. of Germany

[21] Appl. No.: 441,976

[22] Filed: Nov. 28, 1989

[30] Foreign Application Priority Data

Dec. 3, 1988 [DE] Fed. Rep. of Germany ....... 3840869

[51] Int. Cl.[5] .................. B21D 53/10; F16C 19/38
[52] U.S. Cl. .................. 29/725; 29/898.063; 384/539; 384/569; 384/571; 384/585
[58] Field of Search .................. 29/724, 725, 898.061, 29/898.062, 898.063, 898.066, 898.07; 384/447, 539, 569, 571, 585

[56] References Cited

U.S. PATENT DOCUMENTS

| | | | |
|---|---|---|---|
| 998,785 | 7/1911 | Lockwood | 384/571 |
| 1,374,987 | 4/1921 | Christopherson | 384/571 |
| 2,581,958 | 1/1952 | Kingston | 384/447 |
| 4,606,657 | 8/1986 | Tanaka | 334/539 X |
| 4,643,595 | 2/1987 | Weavers | 29/898.063 X |
| 4,732,497 | 3/1988 | Sawa et al. | 384/571 X |

FOREIGN PATENT DOCUMENTS

| | | | |
|---|---|---|---|
| 905561 | 7/1949 | Fed. Rep. of Germany | 29/898.063 |
| 887126 | 1/1962 | United Kingdom | 29/898.063 |

Primary Examiner—Joseph M. Gorski
Assistant Examiner—Peter Dungba Vo
Attorney, Agent, or Firm—Eugene E. Renz, Jr.

[57] ABSTRACT

Attachment means for mounting a first annular member such as a bearing ring having a first seating surface to a second member, such as a housing. The bearing ring has a plurality of recesses formed therein and is made of a material having a predetermined hardness. The housing has a second seating surface and a contact surface disposed angularly to the second seating surface and a fillet surface defining at least one narrow intermediate space at the juncture of the said second seating surface and contact surface. The recesses in said first seating surface open toward the internal end surface and open out into the intermediate spaces, whereas, at the end facing away from this end surface, the recesses are closed off by a boundary wall. By this arrangement, during assembly of the bearing ring in the bore of the housing or to a journal material from the housing or journal is removed to fill the recesses and thereby lock the bearing ring in place.

6 Claims, 5 Drawing Sheets

ATTACHMENT OF A HARD BEARING RING TO THE BORE SURFACE OF A HOUSING OR TO THE LATERAL SURFACE OF A JOURNAL

BACKGROUND OF THE INVENTION

U.S. Pat. No. 2,581,958 shows a bearing ring of relatively hard material pressed on a journal of relatively soft material in a manner whereby the journal is cold worked and some of the journal material is pressed into recesses formed in the bearing ring or journal. The problem with this type of assembly is the fact that some of the material which is scraped off as a result of the cold working can intrude between the contact shoulder of the journal and the end surface of the bearing ring confronting the contact shoulder; This results in the bearing ring assuming a skewed position on the journal. This is an improper orientation of the bearing ring on the journal. Moreover it has been found that in this type of assembly, the bearing ring is not secured reliably enough against turning and it has been observed that the ring tends to creep on the peripheral surface of the journal which is undesirable.

SUMMARY OF THE INVENTION

With the foregoing in mind, it is an object of the present invention to provide an improved means for securing a hard bearing to the bore surface of the housing or the peripheral surface of a journal which overcomes the difficulties and disadvantages of the prior assemblies, particularly the type discussed above. Thus, in accordance with the present invention, the desired direct contact between the bearing ring and the contact shoulder of the housing journal is guaranteed. Further, the attachment means secures the bearing ring with maximum reliability against turning in the bore surface of the housing or on the lateral peripheral surface of the journal.

To this end, in accordance with the principal embodiment of the invention, recesses are provided in the seating surface of the bearing ring which are open toward axial end surfaces of the bearing ring and are closed off by a boundary wall extending as far as the seating surface. Further, in the space between the bearing ring and a fillet surface of the contact shoulder of the housing or journal at least one narrow intermediate space is formed. By this arrangement, as the hard seating surface of the bearing ring is pressed axially into the bore surface of the housing or over the lateral peripheral surface of the journal, relatively soft material of the housing respectively journal is pressed into the recesses formed in the seating surface of the bearing ring. As the pressing or seating operation continues, this softer material is gripped by the external boundary walls of the recesses and pressed generally into the intermediate space between the fillet surface of the contact shoulder of the housing respectively journal and the axial end surface of the bearing ring. This material then grips the fillet surface which either is rough or has been broken up around its periphery by ribs or the like, whereby the bearing is held firmly in the housing or on the journal. By the present invention, the bearing ring is seated in a firm enough manner to resist turning in the bore surface of the housing or on the lateral periphery surface of the journal. The displaced and cold work material is collected in the intermediate spaces and rendered harmless so that the end surface of the bearing is in direct contact with the solid contact shoulder of the housing journal without entrapment of any scraped off particles of the displaced material therebetween.

In accordance with another feature of the present invention, the fillet surface of the shoulder of the housing journal is machined into the contact shoulder axially opposite the recesses in the seating surface of the bearing ring. By this arrangement, the material displaced as the bearing ring is assembled is located behind the contact shoulder of the housing or journal.

In accordance with still another feature of the present invention, at least some of the boundary walls of the recesses of the seating surface of the bearing ring have a sharp edge at the transition of the seating surface which functions like the cutting edges of a shaping tool with the effect that these edges grip certain peripheral points of the housing or journal and shear material from the bore surface of the housing, which then is displaced into the associated recesses. These recesses in the seating surface of the bearing ring may have a rectangular contour when viewed from the top, thereby defining a pair of spaced, longitudinal, axially extending walls which function as guide means for the displaced material to direct the same toward the axial end surface of the bearing ring.

In accordance with still another feature of the present invention, the bearing ring is provided with a peripheral edge relief surface between the axial end surface and seating surface or by the intermediate space in the shape of a ring or annulus located between the relief surface and the fillet surface. By this arrangement, the bearing ring is blunted at the peripheral points of the transition of its internal end surface toward the seating surface, so that no material is sheared at these peripheral points, with the result that the bearing ring radially compresses the material of the bore surface of the housing or of the lateral surface of the journal at the points of its rounded peripheral edges, but does not axially displace it. This prevents the undesirable accumulation of sheared material in the area between the contact shoulder of the journal and the axial end surface of the bearing ring characteristic of the prior art arrangements discussed above.

In accordance with a further specific feature of the invention, the recesses and the bearing ring can be in the form of a notch in the area of the peripheral edge relief surface, so that this surface can be produced rather economically even if the walls of the bearing are rather thin. By this construction, even if the walls of the bearing are rather thin, the strength is not impaired by the recesses.

In still a further specific configuration, the seating surface of the bearing ring has retaining recesses which are bounded at least on the side facing the axial end surface of the bearing ring by a side wall extending up as far as the seating surface, wherein each of the recesses is located in peripheral direction between the end side recesses of the seating surfaces. This construction produces undeformed or only slightly deformed sections in the bore surface of the housing or on the peripheral surface of the journal which, after the bearing ring has been pressed in place, penetrate into the associated retaining recess in the bearing ring.

In accordance with another feature, the bore surface of the housing or the peripheral surface of the journal is formed with radially inward protruding sections which mate precisely in their axial direction with an associated retaining recess in the bearing ring. The bearing ring is held firmly in place by the sections, not only in the peripheral direction, but also in the axial direction.

BRIEF DESCRIPTION OF THE DRAWINGS

These and other objects of the present invention and the various features and details of the operation and construction thereof are hereinafter more fully set forth with reference to the accompanying drawings, wherein.

DETAILED DESCRIPTION OF THE PREFERRED EMBODIMENT

Figure 1:
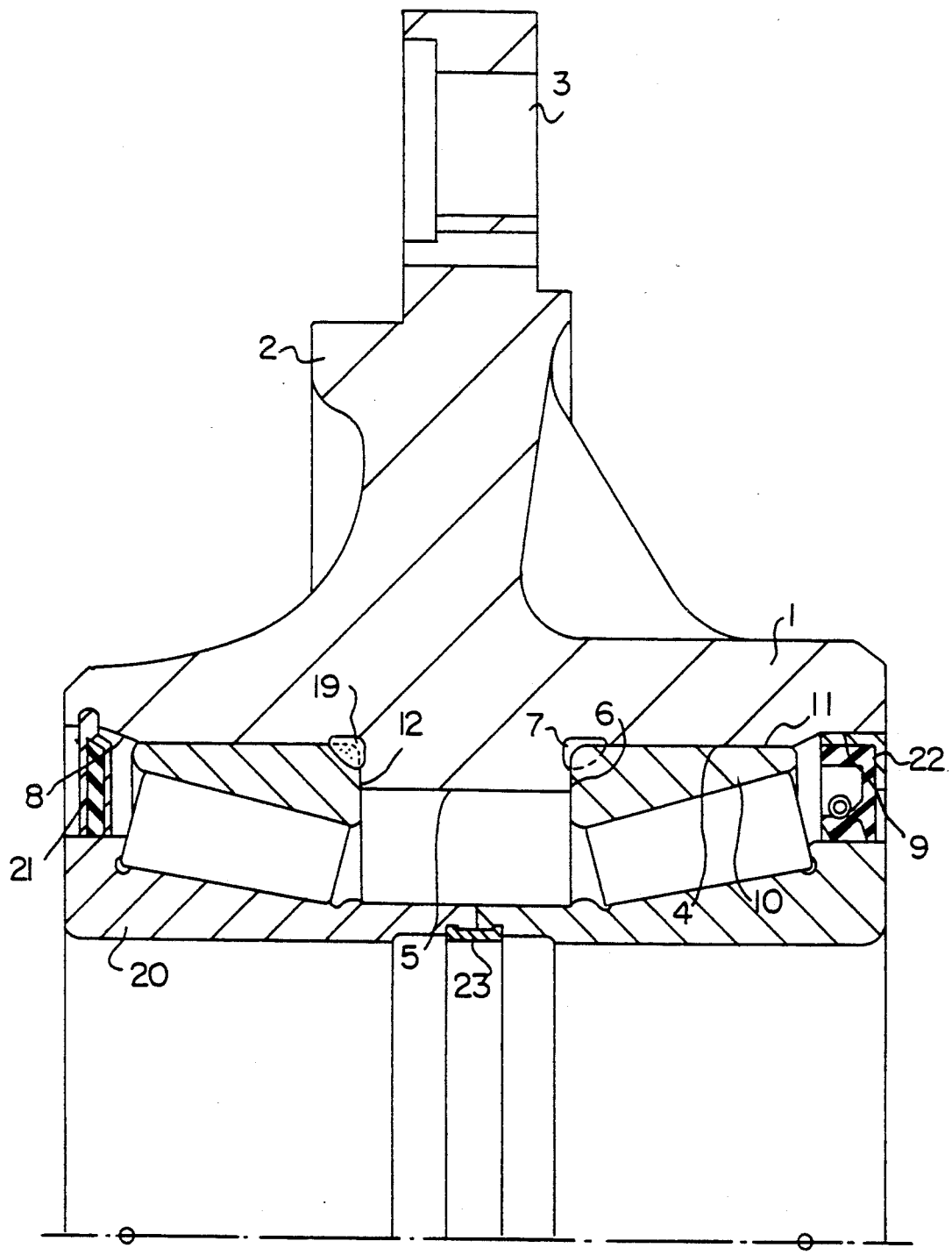
FIG. 1 is a partial longitudinal section through a wheel bearing unit with two bearing rings pressed axially into the bore surface of a housing.

Referring to the drawings and, particular to FIG. 1 thereof, there is illustrated a wheel bearing assembly for the non-driven wheel of a utility vehicle. The assembly includes a housing 1 made from a relatively soft extrudable steel by casting or forging having a peripheral flange 2 with through-going holes 3 circumferentially spaced about the periphery for mounting bolts (not shown).

Housing 1 has two cylindrical concentric bore surfaces 4, 4 adjacent to each other separated by a projection 5 situated between them which projects radially inwardly beyond the bore surfaces 4. The central projection 5 defines flat radial contact shoulders 6, 6 on each side of bore section 5. There is an enlarged peripherally extending fillet surface or channel 7 at the junctive of the radial contact shoulders 6 and bore surface 4. The bore surface 4 for one set of rollers R terminates in a conical surface 8 adjacent the outboard set of rollers and a cylindrical centering surface 9 outboard of the opposite set of rollers R, as seen from the right hand side of FIG. 1. As illustrated, fillet 7 which is machined axially into the contact shoulder 6 and to a certain extent radially into bore surface 4 forms a peripherally extending undercut. As viewed in the peripheral direction, the fillet surface has small irregularities and roughness peaks so that it may be described as being uneven in a truly peripheral plane or direction.

Figure 2:
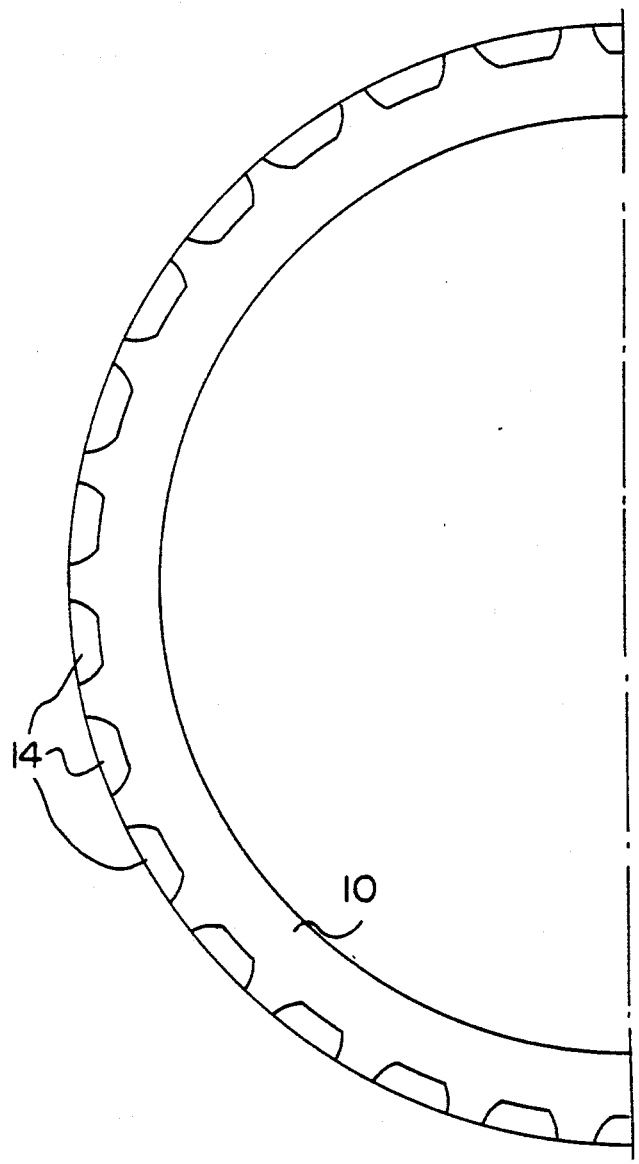
FIG. 2 is a partial side view of one of the bearing rings shown in FIG. 1 in the unassembled state.
Figure 3:
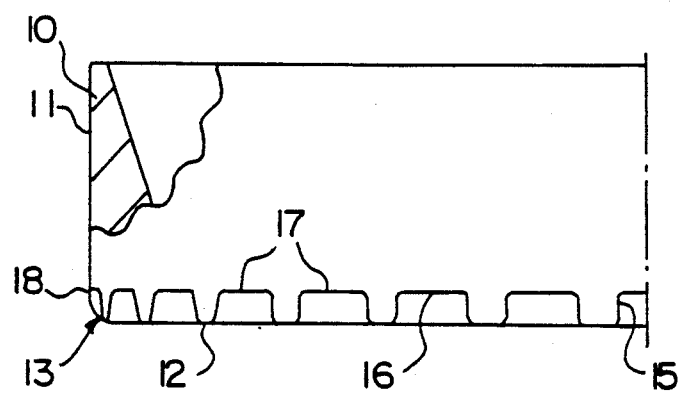
FIG. 3 is a partial top view of the outer seating surface of the bearing ring shown in FIG. 2.

Each of the conical roller bearings comprises an outer bearing ring 10 having a cylindrical outer peripheral seating surface 11 which is of a slightly larger diameter D than the diameter $D_1$ of the bore surface 4. Thus, the bearing rings of the conical roller bearings are mounted with a press fit in the bore surfaces 4. As best illustrated in FIGS. 2 and 3, each bearing ring 10 has a peripherally extending edge relief surface 13 and circumferentially spaced recesses 14 formed by machining at the juncture at the axial end face 12 and cylindrical seating surface 11. In the present instance, the recesses 14 are uniformly distributed about the periphery and are located one after another in the peripheral direction. Each recess 14 has a generally rectangular contour as viewed from the top defining longitudinally extending walls 15 which extend in an axial direction. The recesses 14 are closed by a boundary wall 16 which extends as far as the seating surface 11 in the direction facing away from the axial end surface 12. The boundary walls 16 have a sharp edge 17 at their transition to seating surface 11 which acts and functions like the cutting edge of a shaping tool when a hardened bearing ring is pushed axially in place. More specifically, edge 17 removes material from the bore surface 4 by a scraping action and deposits it into the associated recess 14 of the bearing ring 10. The transition 18 to seating surface 11 of edge relief surface 13 is smooth and convex in cross section as best shown in FIG. 3. Thus, when bearing ring 10 is pushed axially into place, the transition 18 functions like a smoothing tool to compress the material of bore surface 4 in a radially outwardly direction but does not remove any material during the installation process.

Figure 4:
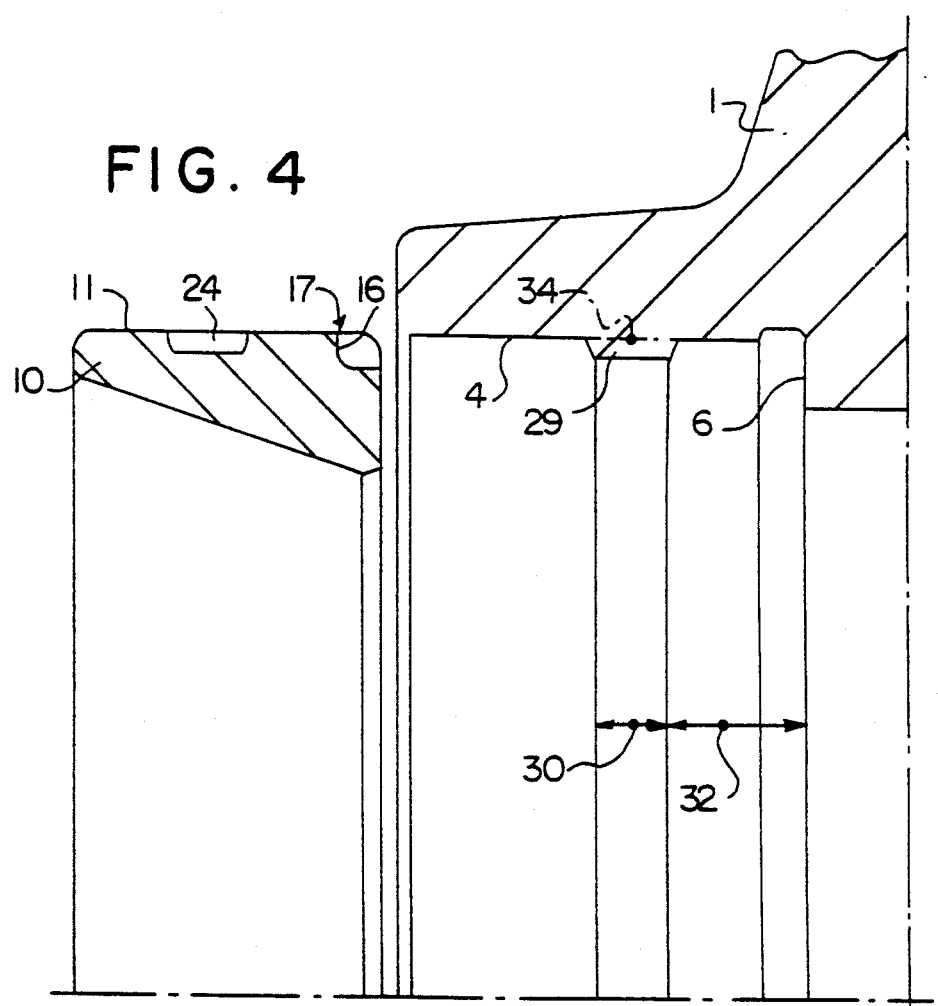
FIG. 4 is a partial longitudinal section through a housing of a wheel bearing unit with an associated bearing ring before it is pressed axially into the bore surface of the housing.

Boundary wall 16 of each recess 14 is designed in such a way that the distance $L_1$ between it and the axial end surface 12 of bearing ring 10 is slightly greater than the distance $L_1$, between rounded transition 18 of edge relief surface 13 and the axial end surface. As shown in FIGS. 1 and 4, a narrow intermediate space 19 is formed between bearing ring and fillets surface 7 located in the present instance between the peripheral edge of edge relief surface 7 is in the form of an annulus or ring. Since recesses 14 open out into this intermediate space 19, material is collected in each recess 14 during assembly of bearing 10 as it is being pressed on is displaced axially into intermediate space 19. Accordingly, after the bearing ring has been fully seated, the intermediate space 19 is filled with scraped off compressed and consolidated material of the housing.

Considering now assembly of the bearings, the bearing ring 10 is first inserted into centering surface 9 which has a slightly larger diameter $D_2$ than the diameter D of seating surface 11 of bearing 10. The centering surface 9 guides the bearing ring 10 as it is pushed axially into place. During this assembly cycle, the bearing ring is first pressed axially against conical surface 8 and thus forced radially inwardly. In this state, the bearing ring 10 is pushed axially into bore surface 4 and snugged up against associated contact shoulder 6.

After the two bearing rings 10 have been pressed into place, the conical raceways $R_P$ of the two bearing rings are finished a single clamping position of the housing 1 in a chuck of a conventional grinding machine. By this procedure, the raceway of the two rings 10 can be given a high degree of dimensional and geometric accuracy together with accurate relative positions of the two raceways in the housing 1. Thereafter, the bearing assembly is filled with grease and completed with the appropriate inner bearing rings 20, set of rollers R and seals 21 and 22 which close the outer axial ends as illustrated. A retaining ring 23 for securing the inner bearing rings 20 together axially is snapped into the bore of these two inner rings.

Figure 5:
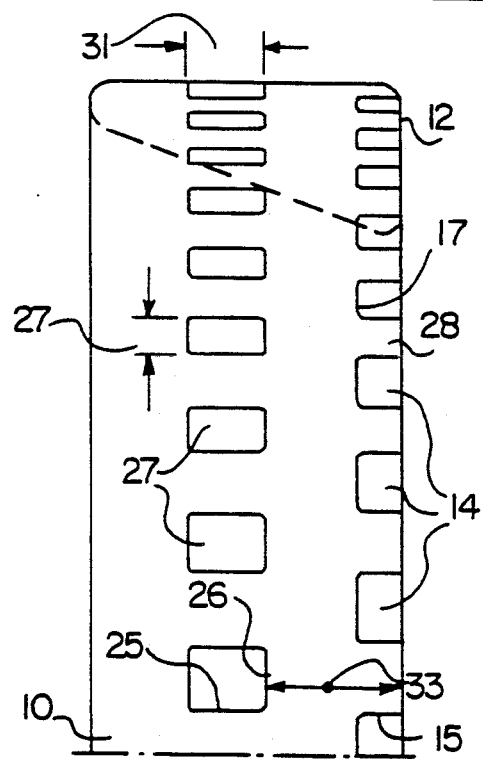
FIG. 5 is a partial top view of the external seating surface of the bearing ring shown in FIG. 4.

There is shown in FIGS. 4 and 5 a modified system for securing a hard bearing 10 in the bore surface 4 of a housing 1. In accordance with this embodiment, the seating surface 11 of bearing 10 is designed in exactly the same way as in the above described embodiment. The bearing ring 10 also has the array of recesses 14 around its periphery. However, in addition to these recesses 14, bearing ring 10 also has retaining recesses 24 which have a rectangular contour defining two axially oriented boundary walls 25 as viewed from the top.

Each retaining recess 24 is bounded by a peripheral side wall 26 which extends radially as far as the seating surface 11 and faces toward and away from the axial end face 12. Additionally, the retaining recesses 24 are separated from the recesses 14 by a predetermined distance and are arranged one after the other about the periphery. Retaining recesses 24 are a predetermined fixed distance apart in the peripheral direction, the distance being calculated so that each recess falls between two axially adjacent recesses 14. Additionally, the retaining recesses 24 preferably have a width 27 on a peripheral side which is exactly the same as the width 27a on the peripheral side of section 28 of seating surface 11 located between two adjacent recesses 14.

The bore surface 4 of the housing 1 has a radially inwardly directed circumferentially extending projection 29 which as illustrated, extends inward slightly beyond the bore surface 4. The axial width 30 of the projection 29 is preferably the same as the axial width 31 of retaining recess 24. Projection 29 is separated from contact shoulder by a distance 32 which is exactly the same as the axial distance 33 between the retaining recesses 24 and inner axially end face 12 of bearing ring 10. By this configuration, when the bearing ring 10 is pressed on and pushed axially inwardly into bore surface 4, the sharp edges 17 and recesses 14 engage and grip projection 29 and cut a longitudinal groove 34 into the projection 29 a depicted by the dotted lines in FIG. 4. When the inner axial end face 12 of bearing ring 10 is then snubbed up against contact shoulder 6 of housing 1, each of the intact sections 3a of projections 29 remaining between grooves 34 function as locking tabs 34a pressing or snapping radially from the outside into a retaining recess 24 in the bearing ring 10. In this manner, the bearing ring 10 is held secure not only by its recesses 14 but also by the retaining recesses 24 and, by reason of this configuration, is prevented from turning or rotating in housing 1. In addition, the locking tabs 29a secure the bearing ring 4 against being pulled off axially from the housing 1.

Figure 6:
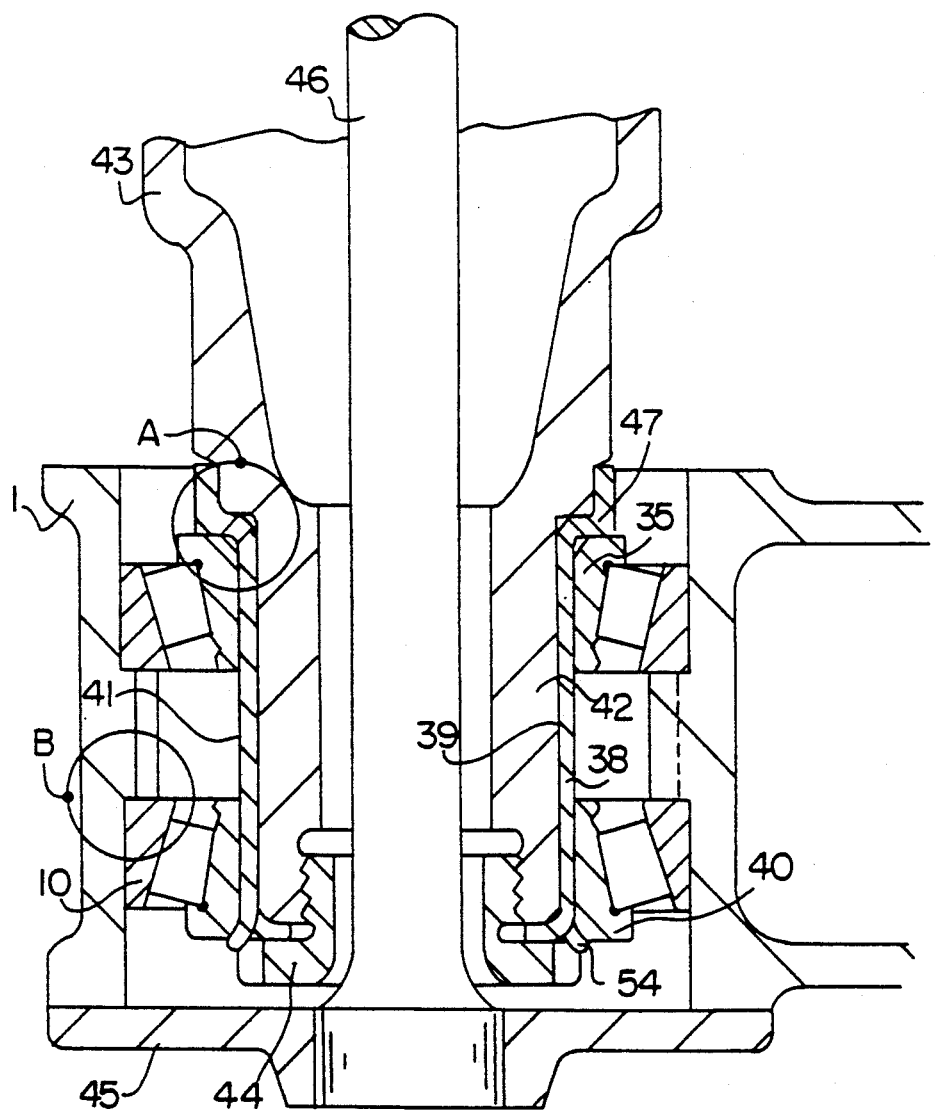
FIG. 6 is a longitudinal section through a swivel bearing with two outer rings pressed axially into a bore surface of a housing and an inner bearing ring pressed axially onto the journal of a support tube.
Figure 8:
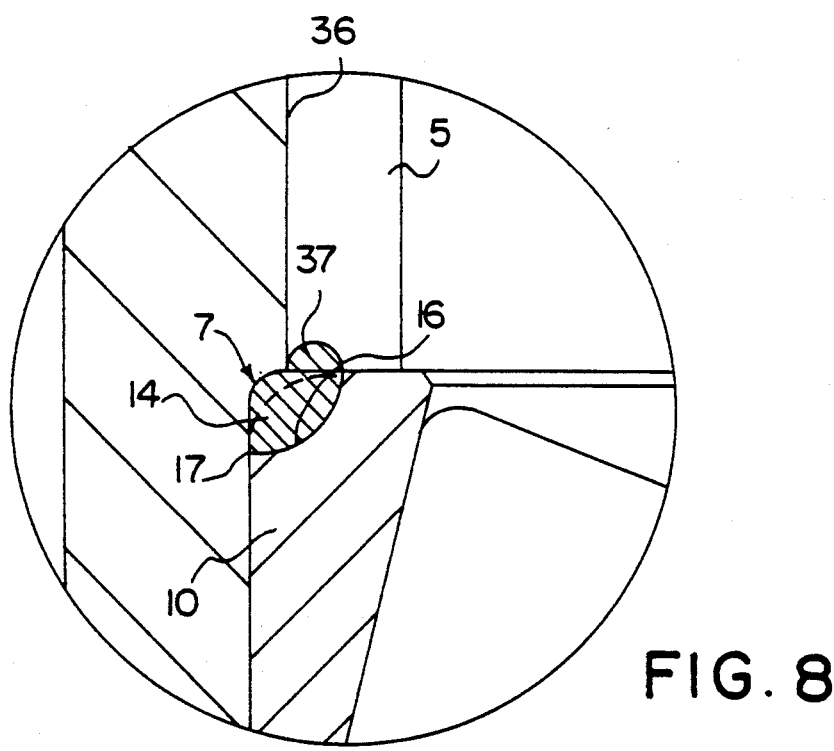
FIG. 8 is an enlarged view of the area designated "B" in FIG. 6.

FIG. 6 shows a swivel mount incorporating a mounting arrangement in accordance with the present invention. More specifically, there is shown the mounting of two outer bearing rings 10 and the attachment of the associated combination inner ring 35 of a swivel mount. The two outer bearing rings 10 are configured in exactly the same way as the bearing rings shown in FIGS. 1, 2 and 3 described above. However, in the swivel mount illustrated, grooves 36 extending up to fillet surface 7 are machined into bore section 5 of housing 1 so that excess material 37 of housing 1 which has been pushed into narrow intermediate space 19 then grips these grooves tightly in the manner shown in FIG. 8. The combination inner bearing ring 35 is made of a hard material and comprises a stepped sleeve 38 having an internal seating surface 39 and an external peripheral surface in which the two inner rings 40 of the conical roller bearing are firmly seated. As illustrated in FIG. 6, the housing 1, outer bearing rings 10, conical roller R and combination inner ring 35 form a self contained integral unit or assembly filled with a lubricant such as lubricating grease. This unit or assembly is firmly seated on lateral surface 41 of journal 42 of a support tube 43 made of mild steel. The structural unit is held axially on journal 42 by means of a nut 44. Housing 1 is connected in a torsion proof manner to a torsion bar 46 by means of a flange cover 45.

Figure 7:
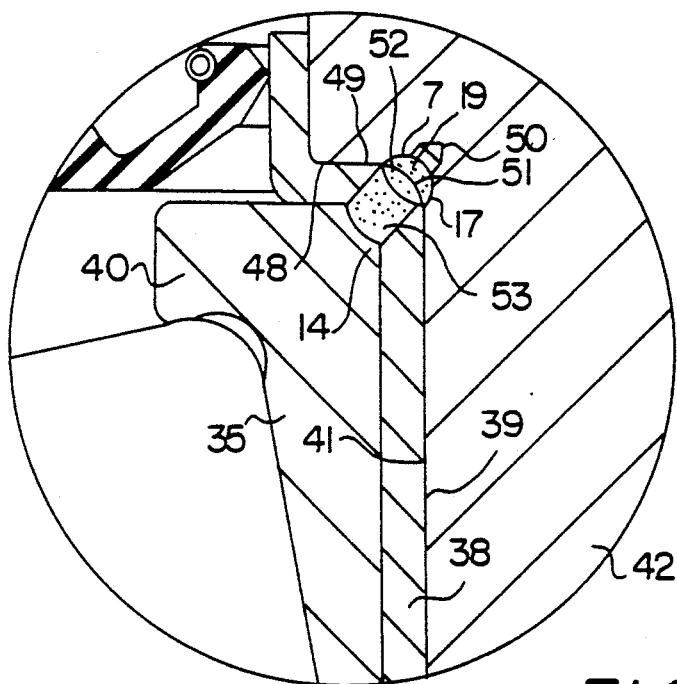
FIG. 7 is an enlarged view of the area designated "A" in FIG. 6.

Stepped sleeve 38 has a collar section 47 with an internal end surface 49, which rests against a flat contact shoulder 48 of journal 42. At the transition between its lateral surface 41 and its contact shoulder 48, journal 42 has a peripheral fillet surface 7, which is interrupted by blind holes 50 around its periphery. Notch-like recesses 52 are machined into seating surface 39 and an adjacent edge relief surface 51 of stepped sleeve 38. These recesses are open toward internal end surface 49 and are closed on the end facing away from the surface by a boundary wall extending as far as seating surface 39. (FIG. 7). To hold the material of journal 42 which has backed up in recesses 52, a narrow, ring-shaped intermediate space 19 is formed between stepped sleeve 38 and fillet surface 7. All recesses 52 are designed to open out axially into this intermediate space 19. Stepped sleeve 38 also has radial through holes 53, each of which opens outs in the base of one of recesses 52.

When bearing ring 35 is pressed axially onto lateral surface 41, the internal end surface 49 of bearing ring 35 comes to rest against contact shoulder 48. As this happens, material is scraped off the journal 42 by the sharp edges 17 of the boundary wall and pushed into the intermediate space 19 between bearing ring 35 and fillet surface 7. Some of the material arrives in holes 53 and is then pushed through these holes 53 and grips recesses 14 in inner ring 40 of the internal conical roller bearing of the swivel mount. At the same time, some of the material is pushed into blind holes 50 in fillet surface 7 of journal 42. Accordingly, after bearing ring 35 has been pushed on, inner ring 40 of the internal conical roller bearing and stepped sleeve 38 are held in a torsion-proof manner on journal 42.

Inner ring 40 of the external conical roller bearing is prevented from turning on stepped sleeve 38 by bent-over tabs 54, which engage in recesses 14 in inner ring 40 to provide a form-locking connection. These tabs 54 are held and locked in their bent-over position by nut 44.

Even though particular embodiments of the present invention have been illustrated and described herein, it is not intended to limit the invention and changes and modifications may be made therein within the scope of the following claims. For example, several intermediate spaces can be present between the bearing ring and fillet surface of the contact shoulders of the housing or of the journal instead of just the single ring-shaped intermediate space. Further, while it preferred that the boundary walls of all the recesses have sharp edges, the edge can be machined on only one of these boundary walls to produce an equivalent function.

What is claimed is:

1. A device for securing a bearing rolling element, comprising, in combination:
   a first annular member having a first seating surface which has a plurality of recesses formed therein, said first annular member being made of a material having a predetermined hardness;
   a second member having a second seating surface for mating with said first seating surface and a contact shoulder disposed angularly to said second seating surface, said second member being made of a material having a hardness that is softer than said predetermined hardness of said first annular member, said second seating surface and said contact shoulder forming a fillet surface defining at least one narrow intermediate space;

said first annular member having a peripheral edge relief surface between its internal end surface and its seating surface so that the intermediate space is formed in the shape of a ring between said relief surface and the fillet surface;

said plurality of recesses having a closed end facing away from said intermediate space and an open end facing toward said intermediate space, whereby said recesses collect any of said second seating surface material displaced by mating with said first seating surface.

2. The combination as claimed in claim 1, wherein the edge relief surface of said first annular member has the shape of an edgeless, convexly curved transition to the seating surface when seen in cross section.

3. The combination as claimed in claim 2, wherein a wall of each recess of said first annular member is separated from the internal end surface of said first annular member by a distance which is slightly greater than the distance of the convexly curved transition of the edge relief surface from said end surface.

4. A device for securing a bearing rolling element, comprising, in combination:

a first annular member having a first seating surface which has a plurality of recesses formed therein, said first annular member being made of a material having a predetermined hardness, said seating surface of said first annular member has retaining recesses which are bounded, at least on the side facing the internal end surface of said annular member, by a side wall extending up as far as the seating surface, each of these recesses being located between two adjacent recesses on the seating surface;

a second member having a second seating surface for mating with said first seating surface and a contact shoulder disposed angularly to said second seating surface, said second member being made of a material having a hardness that is softer than said predetermined hardness of said first annular member, said second seating surface and said contact shoulder forming a fillet surface defining at least one narrow intermediate space;

said plurality of recesses having a closed end facing away from said intermediate space and an open end facing toward said intermediate space, whereby said recesses collect any of said second seating surface material displaced by mating with said first seating surface.

5. The combination as claimed in claim 4, wherein said recesses are separated from recesses of said first annular member by a certain axial distance and have a peripheral width which is exactly the same as the peripheral width of the section of the seating surface which is present in each case between the two adjacent recesses on the periphery.

6. The combination as claimed in claim 4 including retaining recesses on the seating surface of said first annular member, each of these recesses being closed off on the end facing the internal end surface by a side wall extending as far as the seating surface and wherein the seating surface of the second member has a peripheral projection extending slightly beyond this surface, the axial width of this projection from the contact shoulder of said second member being exactly the same as the axial distance of the retaining recesses from the internal end surface of said first annular member.

* * * * *